March 14, 1939. L. J. BERNHARDT 2,150,577
CENTER FINDER AND INDICATOR FOR LATHES AND THE LIKE
Filed Jan. 20, 1938 2 Sheets-Sheet 1
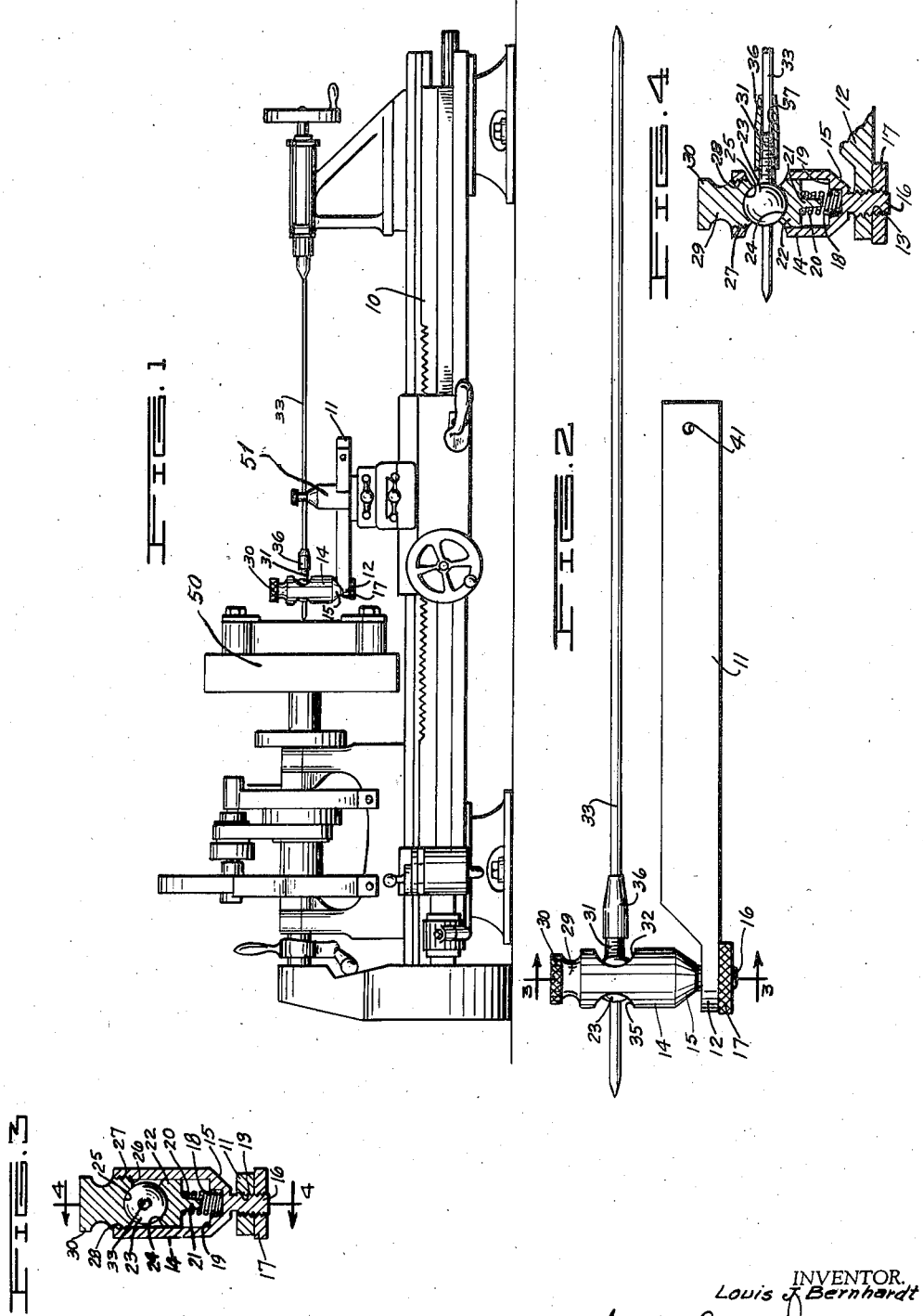
INVENTOR.
Louis J. Bernhardt
BY John A. Bernhardt
ATTORNEY.

March 14, 1939. L. J. BERNHARDT 2,150,577
CENTER FINDER AND INDICATOR FOR LATHES AND THE LIKE
Filed Jan. 20, 1938 2 Sheets-Sheet 2
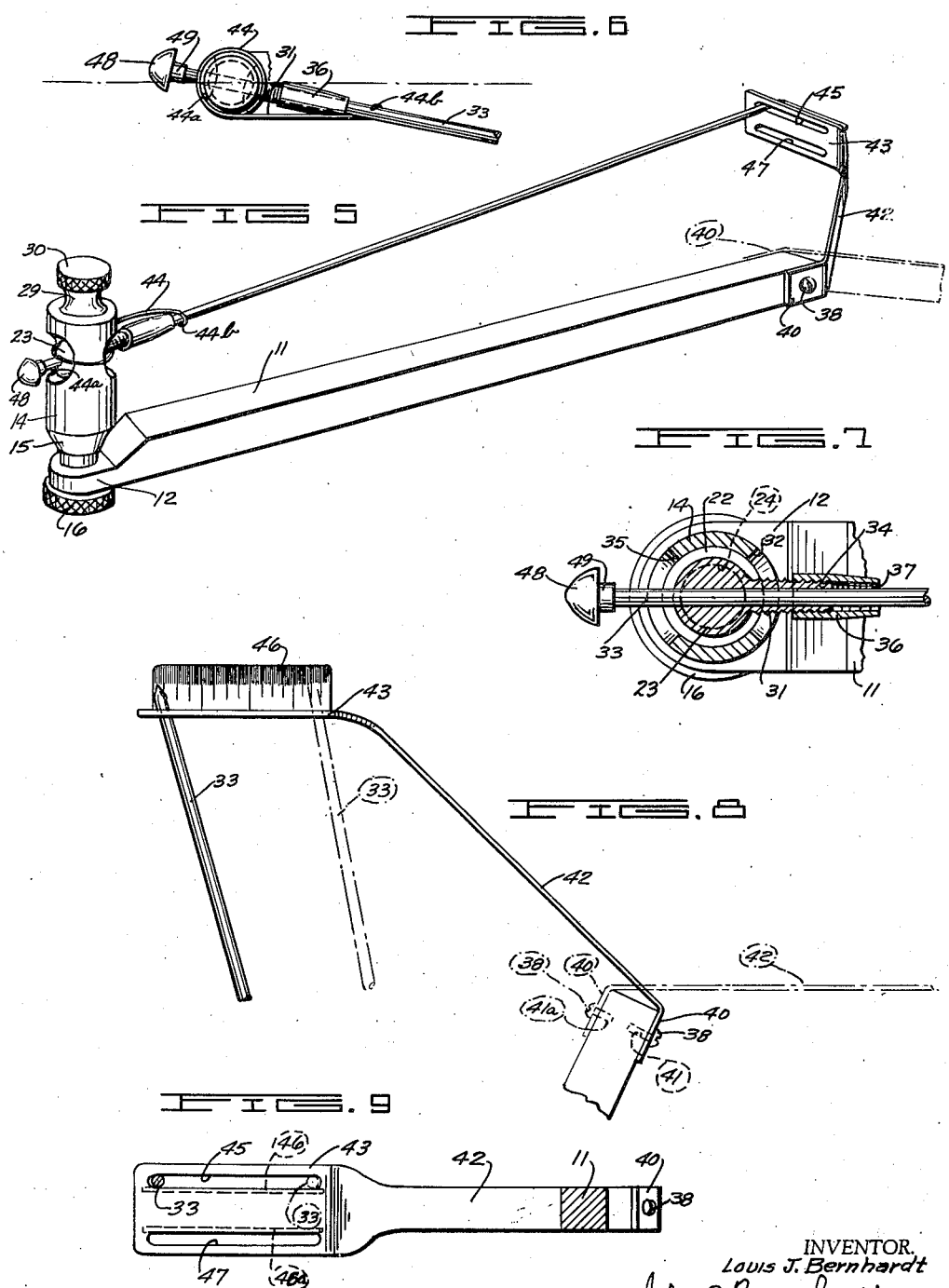
INVENTOR.
Louis J. Bernhardt
BY John A. Bernhardt
ATTORNEY.

Patented Mar. 14, 1939

2,150,577

UNITED STATES PATENT OFFICE 2,150,577

CENTER FINDER AND INDICATOR FOR LATHES AND THE LIKE

Louis J. Bernhardt, Cleveland, Ohio

Application January 20, 1938, Serial No. 185,902

1 Claim. (Cl. 33—172)

My invention relates to center finders for lathes, boring machines and the like and has for its object to provide a means for determining the proper position of the work in relation to the center point to be bored, milled or the like by the proper tool and also for aligning and truing other kinds of work.

Another object is to provide a means whereby the center finder also becomes an indicator and may be used with a scale attachment secured thereto to ascertain correct scale settings to within a two thousandths of an inch.

Still another object is to provide a means for setting the center finder indicator either to the left or right by reversing the scale attachment and the tension spring mounted over the center finder body.

These and other objects and advantages may be seen and noted from the following specification and its accompanying illustrations, in which:

Fig. 1 is a front elevation of a lathe with the center finder in position.

Fig. 2 is an enlarged elevation of the center finder.

Fig. 3 is a section on line 3—3 of Fig. 2.

Fig. 4 is a section on line 4—4 of Fig. 3.

Fig. 5 is a perspective view of a modified form of Fig. 2, but having a maximum and minimum scale limiting device secured thereto which is spring controlled for either maximum or minimum adjustment.

Fig. 6 is a top plan view of Fig. 5.

Fig. 7 is an enlarged sectional view of the device showing the limit of the pivot swing.

Fig. 8 is a top plan view of the limiting scale attachment indicating the different adjustable limited positions, the reversed position being indicated by dot dash lines.

Fig. 9 is an elevational view of Fig. 8.

Referring to the drawings again, a lathe as indicated at 10, has mounted thereon a center finder device comprising a square supporting arm 11 terminating in a graded shouldered portion 12 substantially less than the thickness of the arm 11, and said shouldered portion 12 has threaded aperture 13 therethrough; a hollow body 14 is tapered at 15 and terminates in a threaded stud 16 at its lower end, said threaded stud being mounted through the threaded aperture 13 in the shouldered portion 12 of the square arm 11, and is adjusted therein by a knurled nut 17 screwed upon the projecting end of the threaded stud 16.

A recess 18 in the center of the bottom 19 of the cylindrical hollow body 14 has seated therein a coil spring 20 which extends upwardly within the hollow body 14; a tapered downwardly projecting guide 21 in the center of a lower floating ball socket 22 mounted above said spring is slidably mounted within the top coils of the spring 20, the said lower floating ball socket moving up and down within the hollow body 14.

A ball 23 is pivotally mounted between a top depression 24 of the floating socket 22 and a bottom depression 25 in a top adjustable ball socket 26, said top ball socket having an external threaded portion 27 to engage an internally threaded portion 28 of the body 14, a neck 29 of the top ball socket 26 terminates in a knurled top 30 which projects above the said body 14 for adjusting purposes.

The ball 23 has a hollow tapered threaded stud 31 extending therefrom and projecting through a large circular orifice 32 in the body 14; a center finder or rod 33 extends through a bore 34 in the tapered shaft 31 and ball 23 and projects through a second large circular orifice 35 opposed to and registering with the aperture 32.

A locking sleeve 36 mounted over the center finder 33, and the tapered threaded shaft 31 has a tapered internal thread 37, thus the further said locking device 36 is screwed upon the said tapered threaded shaft 31 the tighter the center finder 33 is held within the bore 34, the center finder thus pivoting with the ball 23 between the sockets 22 and 26.

A means for accurate scale adjustment is supplied by using the center finder 33 as an indicator with the addition of a device attached to either side of the outer end of the square supporting arm 11 by means of a screw 38 inserted through an aperture 39 in the flanged end 40 of the device and secured within a threaded bore 41 or 41a.

This scale device consists of an arm 42 angularly bent to form the flange 40 at one end, the opposite end increasing in area at a point wherein the scale limiting plate 43 projects angularly from said arm 42.

A spring 44 is mounted around the body 14 in such a manner as to secure one end 44a within the orifice 35, and the opposed extended end 44b secured over or under the center finder 33 to hold the opposite end of the said center finder to the left or to the right respectively within a horizontal slot 45 adjacent the top edge of the scale limiting plate 43 directly above a scale 46 projecting angularly therefrom. A second horizontal slot 47 below the first slot 45 and adjacent the bottom of the scale limiting plate 43, is only used when the said slot 47 becomes the top slot as the position of the scale device is reversed as indicated by the dot dash lines in Figs. 5 and 8, a second scale 46a being positioned relative to the slot 47 in the same manner as the scale 46 is positioned relative to the slot 45.

Thus it will be seen that with the reversing of this device and of the spring 44, a maximum or a minimum adjustment may be made either to the left or the right, the center finder 33 becoming an indicator as it is moved over the scales 46a and 46.

A cap 48 has a hollow hub 49 slightly larger in diameter than the center finder or indicator 33, this cap 48 being used to allow finger tip adjustment of the center finder or indicator in relation to the work to be centered or bored, or for any other purpose desired.

In setting up the work in the head stock 50 the supporting bar 11 is clamped in the tool post 51 and the finder is adjusted to find the center, after which the finder is removed and the tool substituted, and the indicating device when used will show the correct setting by means of the scale supported on the center finder.

I claim:

A center finder for lathes and the like, comprising a supporting arm, a hollow cylindrical body mounted thereon and having opposite side openings, a ball and socket mounting in the body, the supporting socket comprising two opposed socket members in the body, one of which is threaded into the body, a spring in the body, supporting the other socket member therein, and a centering rod extending through said ball and openings at a right angle to the axis of the opposed socket members.

LOUIS J. BERNHARDT.